US009529988B2

(12) United States Patent
Torgersrud

(10) Patent No.: US 9,529,988 B2
(45) Date of Patent: *Dec. 27, 2016

(54) DOSSIER PACKAGING

(71) Applicant: Intelmate LLC, San Francisco, CA (US)

(72) Inventor: Richard Torgersrud, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,744

(22) Filed: Feb. 2, 2016

(65) Prior Publication Data
US 2016/0171194 A1 Jun. 16, 2016

Related U.S. Application Data

(63) Continuation of application No. 13/834,677, filed on Mar. 15, 2013, now Pat. No. 9,268,929.

(51) Int. Cl.
*H04L 29/06* (2006.01)
*G06F 21/31* (2013.01)
*G06F 21/33* (2013.01)

(52) U.S. Cl.
CPC .............. *G06F 21/31* (2013.01); *G06F 21/335* (2013.01); *G06F 2221/2111* (2013.01)

(58) Field of Classification Search
CPC .. G06F 21/31; G06F 21/335; G06F 2221/2111
USPC ........................................................... 726/5
See application file for complete search history.

(56) References Cited

U.S. PATENT DOCUMENTS

| 9,251,114 | B1* | 2/2016 | Ancin | G06F 15/17331 |
| 9,268,929 | B2 | 2/2016 | Torgersrud | |
| 2002/0194470 | A1* | 12/2002 | Grupe | H04L 63/0428 713/153 |
| 2003/0101346 | A1* | 5/2003 | Barron | H04L 9/0827 713/175 |
| 2004/0019648 | A1* | 1/2004 | Huynh | H04L 29/06 709/206 |
| 2004/0199760 | A1* | 10/2004 | Mazza | G06F 21/10 713/150 |
| 2005/0154685 | A1* | 7/2005 | Mundy | G06Q 10/0833 705/404 |
| 2005/0160371 | A1* | 7/2005 | Karson | G06F 9/4443 715/777 |
| 2005/0192813 | A1* | 9/2005 | Richard | H04L 51/28 709/206 |

(Continued)

*Primary Examiner* — David Garcia Cervetti
(74) *Attorney, Agent, or Firm* — McDermott Will & Emery LLP

(57) ABSTRACT

The subject technology discloses configurations for receiving a request from a user to log into a communications server in which the request includes user credentials. The user is authenticated based on the included user credentials in the request. The user is then permitted to log into the communications server if the user is successfully authenticated. An input selecting a person of interest is received. The subject technology retrieves information associated with the selected person of interest. A dossier of information including the retrieved information associated with the selected person of interest is generated. The subject technology transmits the generated dossier to the user or an indicated recipient.

20 Claims, 5 Drawing Sheets

(56) References Cited

U.S. PATENT DOCUMENTS

| | | | |
|---|---|---|---|
| 2005/0198165 A1* | 9/2005 | Reddel | H04L 67/06 709/206 |
| 2006/0053078 A1* | 3/2006 | Yamamoto | G06Q 30/06 705/52 |
| 2006/0161457 A1* | 7/2006 | Rapaport | G06Q 10/10 705/2 |
| 2007/0033400 A1* | 2/2007 | Senez, Jr. | H04L 63/0428 713/168 |
| 2007/0250920 A1* | 10/2007 | Lindsay | G06F 21/31 726/7 |
| 2007/0298813 A1* | 12/2007 | Singh | H04L 67/2804 455/456.1 |
| 2008/0028446 A1* | 1/2008 | Burgoyne | H04L 12/58 726/6 |
| 2008/0086646 A1* | 4/2008 | Pizano | H04L 9/3231 713/189 |
| 2008/0147556 A1* | 6/2008 | Smith | G06F 21/10 705/57 |
| 2008/0162527 A1* | 7/2008 | Pizano | G06F 21/10 |
| 2008/0162646 A1* | 7/2008 | Pizano | H04L 51/12 709/206 |
| 2008/0184033 A1* | 7/2008 | Daniels | H04L 9/3247 713/175 |
| 2008/0235587 A1* | 9/2008 | Heie | H04N 7/142 715/719 |
| 2008/0235733 A1* | 9/2008 | Heie | H04N 7/163 725/46 |
| 2008/0294726 A1* | 11/2008 | Sidman | H04L 29/12386 709/206 |
| 2009/0013359 A1* | 1/2009 | Butler | G06Q 30/06 725/105 |
| 2009/0055220 A1* | 2/2009 | Rapaport | G06Q 50/22 705/2 |
| 2009/0070744 A1* | 3/2009 | Taylor | G06Q 10/10 717/128 |
| 2009/0228822 A1* | 9/2009 | Miyata | G03G 15/5016 715/771 |
| 2009/0271787 A1* | 10/2009 | Clark | G06F 9/455 718/1 |
| 2009/0282451 A1* | 11/2009 | Jensen | G06F 17/30035 725/117 |
| 2010/0037324 A1* | 2/2010 | Grant | G06F 21/554 726/27 |
| 2010/0197351 A1* | 8/2010 | Ewell, Jr. | H04M 1/66 455/565 |
| 2010/0251173 A1* | 9/2010 | Imanishi | H04N 7/17318 715/810 |
| 2010/0259473 A1* | 10/2010 | Sakata | G06F 3/017 345/156 |
| 2011/0055677 A1* | 3/2011 | Lima | G06Q 10/06 715/201 |
| 2011/0099621 A1* | 4/2011 | Lizarraga | G06F 17/30902 726/13 |
| 2011/0238435 A1* | 9/2011 | Rapaport | G06Q 10/10 705/2 |
| 2011/0238990 A1* | 9/2011 | Pizano | G06F 21/10 713/168 |
| 2011/0276493 A1* | 11/2011 | Graham, III | G06Q 20/102 705/53 |
| 2011/0282944 A1* | 11/2011 | Henderson | G06Q 10/06 709/204 |
| 2011/0302258 A1* | 12/2011 | Huynh | H04L 29/06 709/206 |
| 2012/0157040 A1* | 6/2012 | Naito | H04L 12/1428 455/406 |
| 2012/0215684 A1* | 8/2012 | Kidron | G06F 17/30867 705/39 |
| 2012/0222132 A1* | 8/2012 | Burger | G06F 21/604 726/28 |
| 2013/0007129 A1* | 1/2013 | German | G06F 11/3031 709/204 |
| 2013/0019002 A1* | 1/2013 | Heileman | G06F 21/10 709/223 |
| 2013/0031355 A1* | 1/2013 | Pizano | G06F 21/10 713/150 |
| 2013/0055411 A1* | 2/2013 | Yang | H04W 12/08 726/30 |
| 2013/0097562 A1* | 4/2013 | Kermoian | H04M 1/72597 715/841 |
| 2013/0219179 A1* | 8/2013 | Pizano | H04L 9/3231 713/168 |
| 2013/0226876 A1* | 8/2013 | Gati | G06F 17/30079 707/652 |
| 2013/0318589 A1* | 11/2013 | Ford | H04L 63/08 726/7 |
| 2014/0040761 A1* | 2/2014 | Liu | G06F 17/30241 715/747 |
| 2014/0041052 A1* | 2/2014 | Follis | H04L 9/3247 726/28 |
| 2014/0058873 A1* | 2/2014 | Sorensen | G06Q 30/0601 705/26.1 |
| 2014/0123228 A1* | 5/2014 | Brill | H04L 63/1416 726/4 |
| 2014/0223099 A1* | 8/2014 | Kidron | G06F 12/0806 711/118 |

* cited by examiner

DOSSIER PACKAGING

CROSS-REFERENCE TO RELATED APPLICATIONS

The present application is related to and is a continuation application of U.S. Pat. No. 9,268,929 entitled "DOSSIER PACKAGING" by Richard Torgersrud, issued on Feb. 23, 2016, the contents of which are hereby incorporated by reference in their entirety, for all purposes.

BACKGROUND

The present disclosure generally relates to computer systems, and more particularly to the use of a computer system to obtain information regarding an individual.

SUMMARY

The subject technology provides computer-implemented method including: receiving a request from a user to log into a communications server in which the request includes user credentials; authenticating the user based on the included user credentials in the request; permitting the user to log into the communications server if the user is successfully authenticated; receiving a first input selecting a person of interest; retrieving information associated with the selected person of interest; generating a dossier of information including the retrieved information associated with the selected person of interest; and transmitting the generated dossier to the user or an indicated recipient.

The subject technology further includes a system. The system includes a memory including instructions, and one or more processors configured to execute the instructions to: receive a request from a user to log into a communications server in which the request include user credentials; authenticate the user based on the included user credentials in the request; permit the user to log into the communications server if the user is successfully authenticated; receive a first input selecting a person of interest; receive a second input defining one or more filters for restricting information associated with the selected person of interest; determine a set of user restrictions associated with the user; retrieve information associated with the selected person of interest based on the defined one or more filters and the determined set of user restrictions; receive a third input selecting a download format for the retrieved information; generate a dossier of information including the retrieved information associated with the selected person of interest; and transmit the generated dossier to the user or an indicated recipient based on the selected download format.

The subject technology further provides a machine-readable medium including instructions stored therein, which when executed by a machine, cause the machine to perform operations including: receiving a request from a user to log into a communications server in which the request include user credentials; authenticating the user based on the included user credentials in the request; permitting the user to log into the communications server if the user is successfully authenticated; receiving a first input selecting a person of interest; receiving a second input defining one or more filters for restricting information associated with the selected person of interest; determining a set of user restrictions associated with the user; retrieving information associated with the selected person of interest based on the defined one or more filters and the determined set of user restrictions; receiving a third input selecting a download format for the retrieved information; generating a dossier of information including the retrieved information associated with the selected person of interest; and transmitting the generated dossier to the user or an indicated recipient based on the selected download format.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

FIG. 4 conceptually illustrates an example graphical user interface for setting user restrictions according to some configurations of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The process for obtaining all deposit, phone call, visitation, and other communication information involving a single detainee (e.g., inmate at a prison or jail) may be difficult and frequently requires multiple searches across multiple systems. Obtaining this data in a format that is appropriate for offline review, such as for archiving or legal discovery, may be even more difficult. The process is further complicated with newer communications systems, such as video visitation, text and video exchange, self-edited profiles, and other digital communication.

For instance, some existing systems may allow for a batch download of call recordings, but nothing else. Thus, for an investigator to download and organize the data available may require a tremendous amount of searching, downloading and organizing. Additionally, some data, such as customer service records, are not available to review or access in existing systems. Likewise, video visitation records typically require a separate login from the detainee phone system.

In particular, existing systems that manage communication records of detainees may have several drawbacks when it comes to offline review of files:

Existing systems may require multiple searches across multiple systems, sometimes requiring multiple logins Frequently, acquiring call data information may require running one or more reports Downloaded files are not organized in a way that allows the simple sorting of information into a timeline of activity, or the filtering of information to show or hide specific types of information Many types of data may not accessible to facility staff (such as call center recordings)

Once downloaded, there may be no mechanism to verify that the files have not been altered or compromised In view of the above, the subject technology allows investigators and other users to download a single file or organized collection of files allowing offline review of content (such as for an investigation), offline storage (such as on a CD, or flash drive for archiving), legal discovery (such as the sharing of files with attorneys), and for use as courtroom evidence. As described herein, this package of offline data may be referred to as a "dossier."

Figure 1:
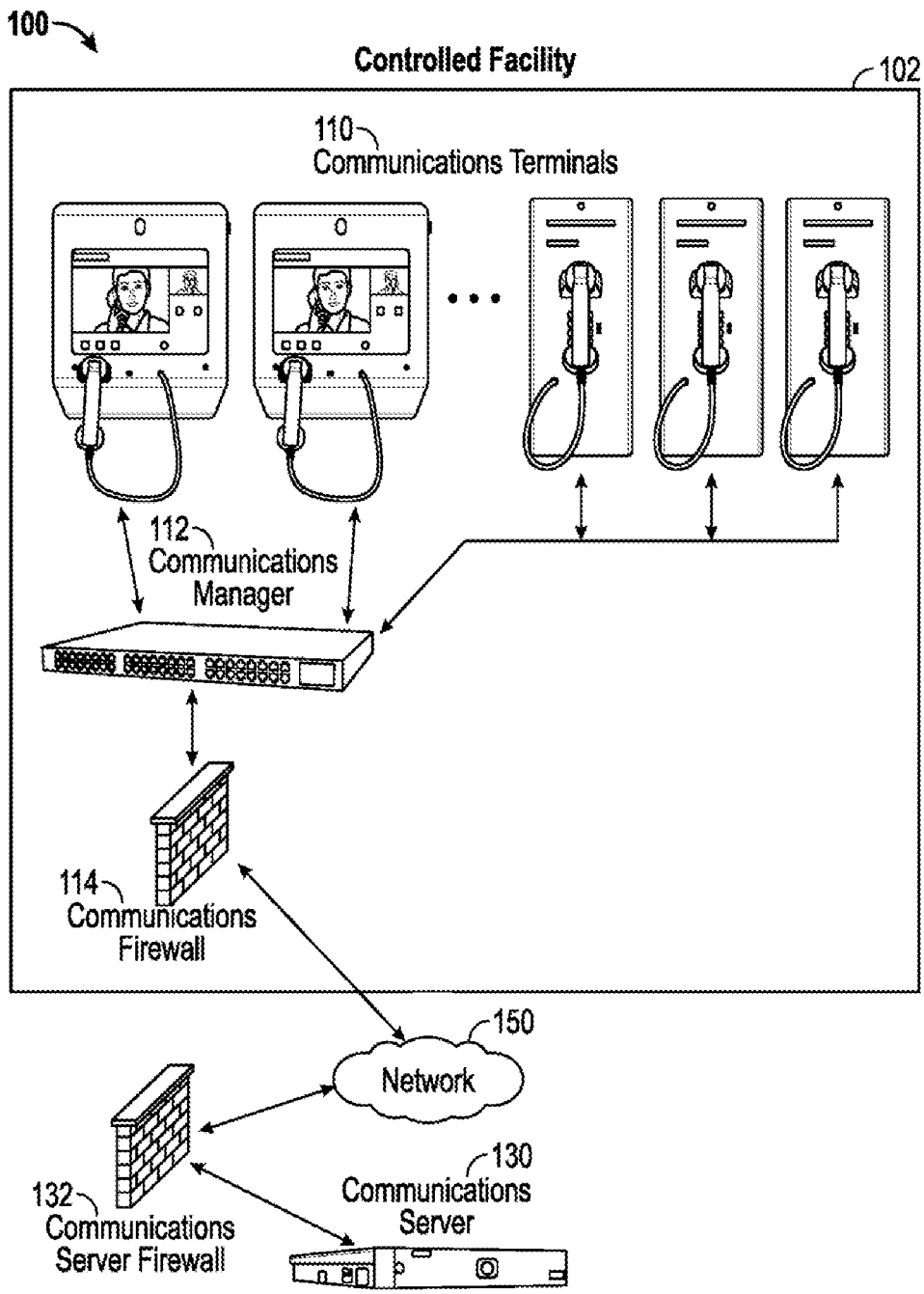
FIG. 1 illustrates an example architecture in which some configurations of the subject technology can be implemented.

FIG. 1 illustrates an example architecture 100 in which some configurations of the subject technology can be implemented. The architecture 100 illustrates a detention environment 102 that includes communications terminals 110 connected to a network 150 through a communications firewall 114 using a communications manager 112. The architecture 100 further includes a communications server 130 as described herein connected to the network 150 through a communications server firewall 132. The firewalls 114 and 132 can be software-based or hardware-based.

Each of the communications terminals 110 is connected to a communications manager 112. In certain aspects, for purposes of load balancing, the communications terminals 110 can be connected to many communications managers. The communications terminals 110 can be audio communication terminals, video communication terminals, tactile communications terminals (e.g., for the visual and/or hearing impaired), or other terminals configured for communication between two individuals. In certain aspects, the communication terminals can be mobile, such as mobile smartphones or mobile kiosks. The communications manager 112 to which the communications terminals 110 are connected can be, for example, a networking device such as a router, gateway, or switch. The communications manager 112 can be configured for various protocols of communication including, for example, Internet Protocol (IP), voice over IP (VoIP), audio and video Internet telephony network protocols, or telephone switching.

The communications manager 112 is connected to the network 150, such as the Internet, a metropolitan area network (MAN), a wide area network (WAN), a broadband network (BBN), and the like. Further, the network 150 can include, but is not limited to, any one or more of the following network topologies, including a bus network, a star network, a ring network, a mesh network, a star-bus network, tree or hierarchical network, and the like. In certain aspects where the communications server 130 is located at the detention environment 102, the network 150 can include, for example, any one or more of a personal area network (PAN), a local area network (LAN), or a campus area network (CAN). The connection between the communications manager 112 and the network 150 can be protected using a communications firewall 114, which can be particularly relevant to protecting the security of the detention environment 102 by limiting log ins to devices in the detention environment 102 to authorized individuals or processes.

The communications server 130 is connected to the network 150 through the communications server firewall 132. The communications server 130 is responsible for hosting resident location information provided by the communications terminals 110 for individuals in the detention environment 102. The communications server 130 can be any device having an appropriate processor, memory, and communications capability for hosting the terminal-based resident location information.

Figure 2:
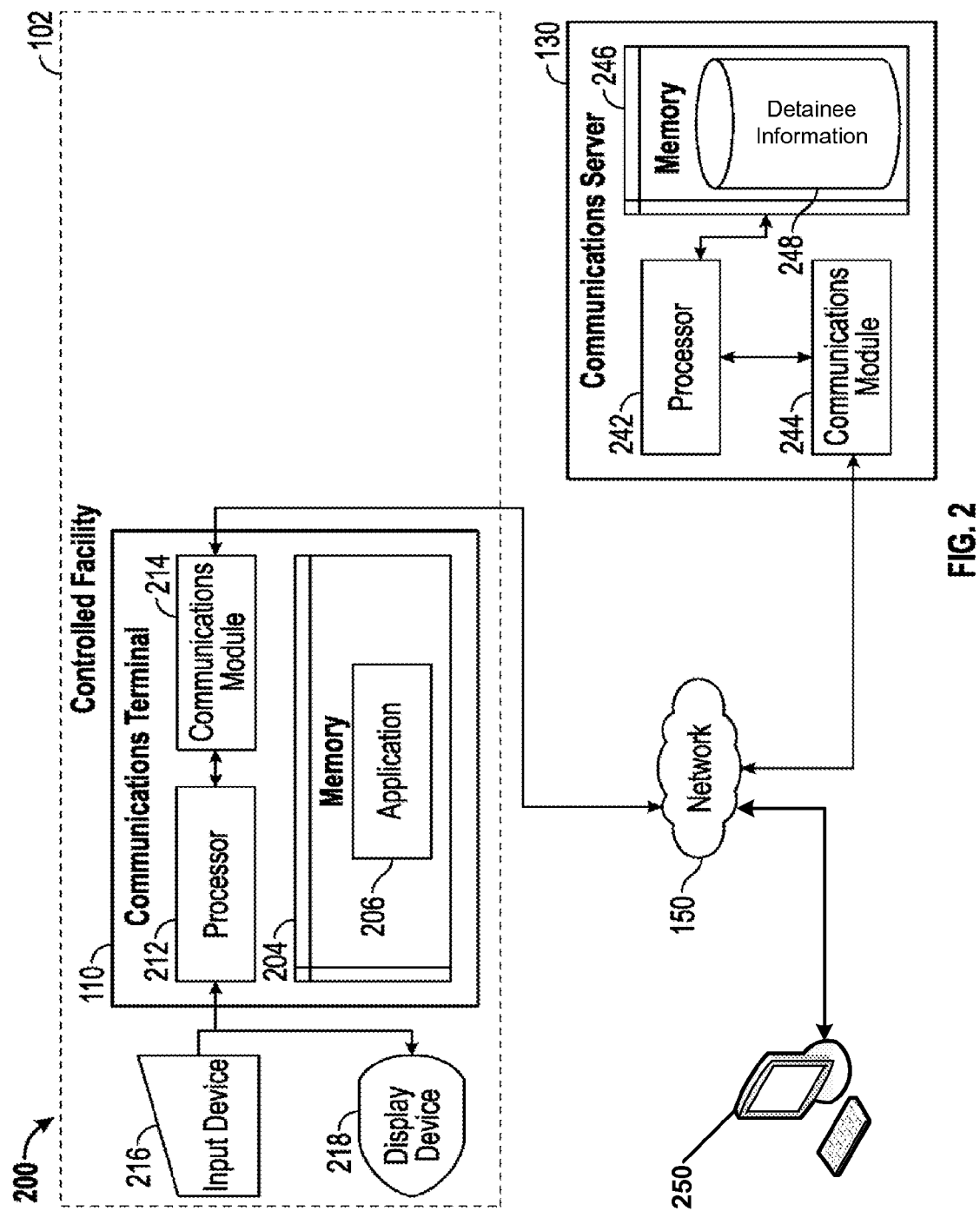
FIG. 2 is a block diagram illustrating an example communications terminal and communications server in the architecture of FIG. 1 according to certain aspects of the disclosure.

FIG. 2 is a block diagram 200 illustrating an example communications terminal 110 and communications server 130 in the architecture 100 of FIG. 1 according to certain aspects of the disclosure. The communications terminal 110 and communications server 130 are connected over the network 150 via respective communications modules 214 and 244. The communications modules 214 and 244 are configured to interface with the network 150 to send and receive information, such as data, requests, responses, and commands to other devices on the network 150. The communications modules 214 and 244 can be, for example, modems or Ethernet cards.

The communications terminal 110, which can be a telephone, videophone, or camera, includes a processor 212 (or connected downstream to a processor, e.g., at communications server 130), the communications module 214, and a memory 204 that includes an application 206. Although the communications terminal 110 is illustrated as including the processor 212 for example only, it is understood that in certain aspects where, for example, the communications terminal 110 is a telephone, the processor 212 is not included in the communications terminal. The application is configured to control log ins to the communications terminal 110. The communications terminal 110 also includes an input device 216 and an output device 214, such as a display. The input device 216 can include, for example, a keyboard, a touchpad, a microphone, a camera, touchscreen, or mouse. The processor 212 of the communications terminal 110 is configured to execute instructions, such as instructions physically coded into the processor 212, instructions received from software (e.g., application 206) in memory 240, or a combination of both.

The processor 212 of the communications terminal 110 is configured to execute instructions, such as instructions physically coded into the processor 212, instructions received from software (e.g., application 206) in memory 240, or a combination of both, to restrict logging in based on the location of the communications terminal 110 within a detention environment 102. For example, the processor 212 of the communications terminal 110 executes instructions from the application 206 to receive (e.g., by input device 216) a request from a user to log into the communications terminal 110.

In some configurations, a processor 242 of the communications server 130 is configured to execute instructions, such as instructions physically coded into the processor 242, instructions received from software in memory 246, or a combination of both. For example, the communications server 130 may provide an interface, such as a web-based application, that allows users to set parameters, such as selecting a person of interest (e.g., a detainee of a jail or prison), and trigger a download of files or data associated with the selected person of interest stored in the detainee information 248 of the memory 246. As illustrated in FIG. 2, a client computing system 250 (e.g., desktop computer, laptop, tablet, mobile device, etc.) may be configured to send a request to the communications server 130 in order to log in the web-based application. The client computing system 250 may then provide inputs from the user to the communications server 130 for interacting with the web-based application.

Although the disclosed block diagram 200 illustrates the detainee information 248 as being stored in the memory 246 of the communications server 130, detainee information 248 can be stored in one or more other communications servers (e.g., a different communication server in a separate or same data center). For example, the detainee information 248 can be provided by the communications server 130 to one or many communications servers, for example, as a form of data replication.

Figure 3:
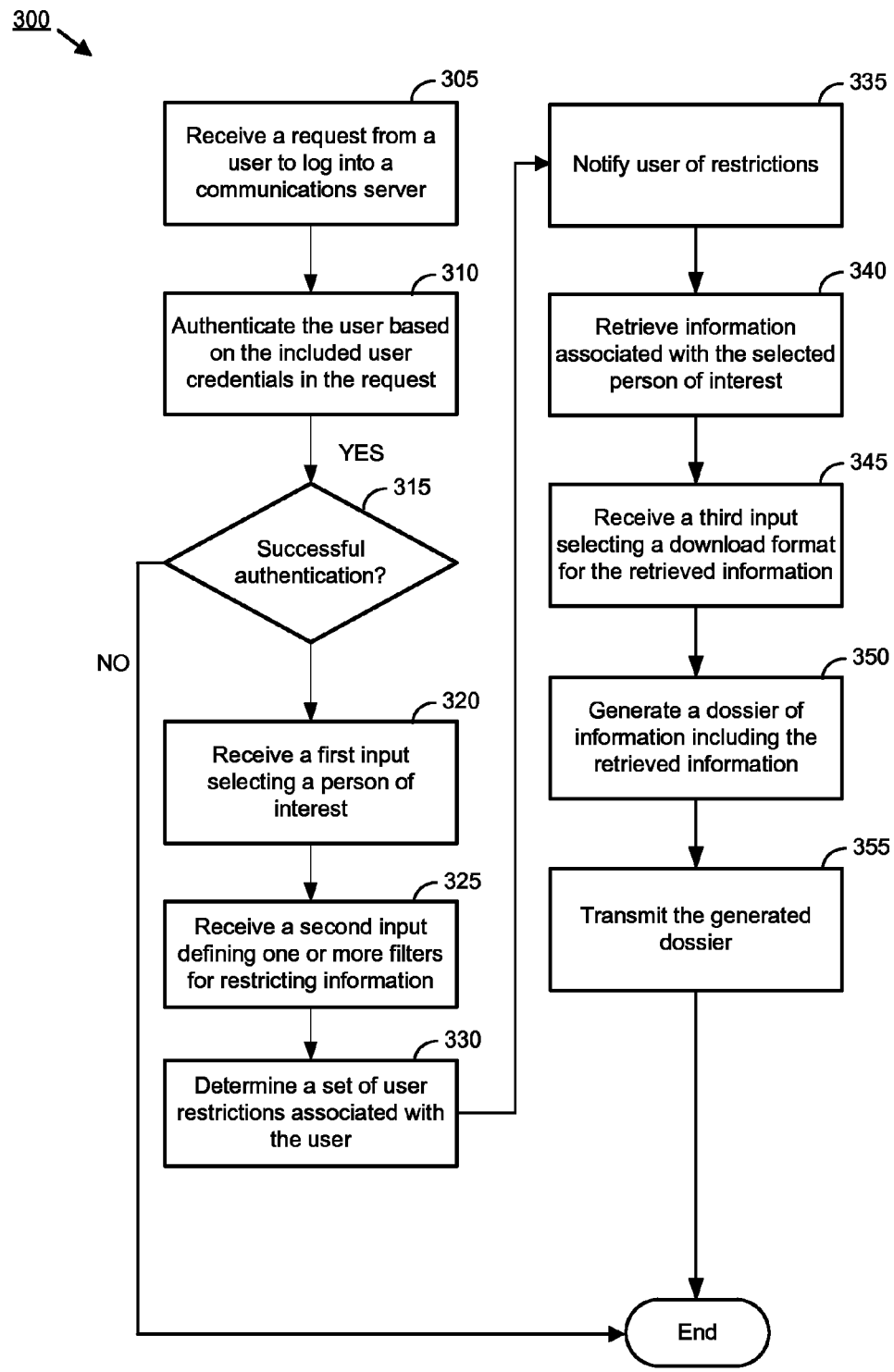
FIG. 3 illustrates an example process for transmitting a dossier of information for a person of interest using the example communications server of FIG. 2.

FIG. 3 illustrates an example process 300 for transmitting a dossier of information for a person of interest using the example communications server 130 of FIG. 2. While FIG. 3 is described with reference to FIG. 2, it should be noted that the process steps of FIG. 3 may be performed by other systems or computing devices. The process 300 begins by proceeding from start step 305 when a request is received from a user (e.g., facility staff, investigator, or lawyer on the client computing system 250) to log into the communications server 130. The user may utilize the client computing system 250 to send the request. In one example, the request includes user credentials (e.g., username, password, token, certificate, etc.). In step 310, the process 300 authenticates the user based on the included user credentials in the request.

In decision step 315, a determination is made whether the user has been successfully authenticated. If the determination of step 315 indicates that the user has not been successfully authenticated, the process 300 ends. If the determination of step 303 indicates that the user has been successfully authentication, the process 300 permits the user to log into the communications server and the process 300 continues to step 320.

In step 320, the process 300 receives a first input selecting a person of interest. In one example, the selected person of interest is a detainee of a jail or prison. To select the person of interest, the user may provide input (e.g., keyboard, mouse, touch, voice, etc.) in the interface of the web-based application provided by the communications server 130.

In step 325, the process 300 receives a second input (e.g., keyboard, mouse, touch, voice, etc.) defining one or more filters (including one or more parameters) for restricting information associated with the selected person of interest. In one example, the defined one or more filters may include at least one of a time period, type of data, a second person connected to the selected person of interest, or any person connected to the selected person of interest. The second person connected to the selected person of interest may be a friend of the selected person of interest or family member of the selected person of interest. More specifically, the filters may be defined according to the following examples:
    a. Who is the Person of Interest: Who does the dossier focus on?
    b. What Time Period: What time range is desired? Is it all time, or a specific time range?
    c. Who Else: Does the dossier cover everyone who interacted with the person of interest, or is it just limited to one or a few others?
    d. What Information: The dossier can include all known information, or it may be limited to specific types of information, such as just include financial transactions. Examples of different types of data listed after these steps.

In step 330, the process 300 determines a set of user restrictions associated with the user. In one example, the set of user restrictions associated with the user include at least one of user privileges, access to data, or download permissions. More specifically, examples of allowed and/or disallowed user rights may include the following:
    a. User privileges: the logged in user's system permissions to access phone recordings, or deposit information, etc.
    b. Access to data: facilities that the user is not attached to (e.g., a facility in a neighboring county where the person of interest may have been incarcerated in the past) may restrict access to data to the user
    c. Download permissions: some user settings prevent users from downloading audio and video files and these permission settings apply to this invention. Changing a user's rights to allow the downloading of recordings would allow downloads to take place.

In step 335, the process 300 may, optionally, notify the user of any user restrictions determined in step 330. For instance, a notification may be sent to the user to indicate certain types of files are not permitted for downloading based on the user restrictions.

In step 340, the process 300 retrieves information associated with the selected person of interest based on the defined one or more filters and the determined set of user restrictions. In one example, the retrieved information associated with the selected person of interest includes data pertaining to: an audio file, video file, attempted call, completed call, rejected call, voicemail, message left for customer service, call to customer service representative, call to automated customer service, exchanged text, exchanged photo, exchanged video, video visit scheduled, video visit completed, kiosk deposit, deposit by mail, deposit over the phone, grievance or inmate request attempted, grievance or inmate request submitted, do not contact block via customer service, do not contact block via web site, investigator note, customer service note, visited website, game played, contact searched, video station login, web login by a friend or family, inmate balance check, or inmate balance transfer. Other types of data may be included and still be within the scope of the subject technology.

By way of example, the following pieces of information are available from a downloaded dossier. Likewise, any of the information below could be filtered out of a dossier, or selected for a dossier.
    Attempted Calls
    Completed Calls
    Rejected Calls
    Voicemails
    Messages left for customer service
    Calls to customer service representative
    Calls to automated customer service
    Exchanged text, photos and video
    Video visits scheduled
    Video visits completed
    Kiosk deposits
    Deposits by mail
    Deposits over the phone Grievances/inmate requests attempted
Grievances/inmate requests submitted
Do not Contact blocks via customer service
Do not Contact blocks via Web site
Investigator notes Customer service notes
Visited Websites (by inmate)
Games played (by inmate)
Contacts searched (by inmate)
Video station logins by inmate
Web logins by friends & family
Inmate balance checks
Inmate balance transfers In step 345, the process 300 receives a third input selecting a download format for the retrieved information. In one example, the selected download format may be an e-mail including a link to the generated dossier, compressed file, Portable Document Format (PDF) file, MHTML file, or webarchive file. Further, the link to the generated dossier may expire after a predetermined period of time for security considerations. More specifically, the dossier may be:

a. Downloaded: downloaded as a compressed file (e.g., zip file) containing both data and recording files, as a single PDF, or as offline web content such as a zipped collection of web files, MHTML file or webarchive format.

b. Emailed: a dossier may be emailed to a third party (e.g., defense attorney) by entering that person's email address. The dossier may be attached as a zip file, or sent as a one-time download link, which can be made more secure for opting for a limited window of availability for the download link.

In step 350, the process 300 generates a dossier of information including the retrieved information associated with the selected person of interest. In one example, the generated dossier includes one or more checksum values (e.g., hash) for verifying the retrieved information included in the generated dossier. Additionally, the communications server 130 may store such checksum values in the memory 246. In one example, an audio file or video file included in the dossier may be compressed to decrease download times. In one example, all recording files and data are compressed or merged into a single downloadable file. Examples of the single downloadable file may include, but are not limited to, TAR, RAR, SIT, GZIP and ZIP formats.

In step 355, the process 300 transmits the generated dossier to the user (e.g., the client computing system 250) or an indicated recipient (e.g., when the download format is an e-mail sent to one or more indicated recipients) based on the selected download format. The process 300 then ends.

In some configurations, at the client computing system 250, the dossier may be verified to ensure that the dossier has not been tampered. For example, the file(s) included in the dossier may be compared with the checksum value(s), which may be a series of characters in an associated text file that act as a digital fingerprint. When a dossier is created, the checksum may be stored separately (e.g., on the communications server 130, or in a file) for future verification of the data (e.g., files) included in the dossier.

In some configurations, each downloaded dossier may include an accompanying text file containing a checksum (e.g., a hash or hashtag) for each recording contained in the dossier (e.g., zip or compressed file). Each checksum may be an MD5 hash of a specific digital file (e.g., audio or video recording, etc.) and may be understood as unique file "fingerprint." Below is an example of a text file that contains digital fingerprints for two audio recordings:

```
2316183ce2cb10de32a0873cccaca178    01_O_Neil_415-412-9861_07-27-11_1215.wav
e8c6f6c54423185044c82cfd947be9ea    02_O_Neil_210-663-0540_07-27-11_1100.wav
```

In some configurations, the text above would be emailed or otherwise distributed separately from the digital recordings to prevent tampering of the digital recordings. Each digital fingerprint allows a user to verify that the file matches the original at any point in the future. To verify that the files have not been altered, a validation tool or application may be utilized to match each so-called "fingerprint" to each corresponding file. In some configurations, the validation tool may be included in a given operating system.

In some configurations, the process 300 may be performed when a user (e.g., investigator or attorney) wishes to download a wide variety of data associated with a detainee for offline access (e.g., without Internet or network access). The following description describes example usage scenarios that might occur regarding a detainee that has been in custody for 12 weeks while waiting for a trial:

Investigator

1. First, an investigator downloads a dossier of all financial, communications and commissary related records related to the detainee to assist in the search for cohorts in the crime that the detainee is accused of committing.
2. The investigator prints a document from the dossier that lists all of the events known to the communications system, which includes calls, deposits, Internet browsing history, games, photos exchanged, grievances filed, and video visits.
3. While the records show hundreds of completed calls to a variety of destinations, the investigator notices a number of attempted calls to a single number that were never accepted. The phone number is associated with a person who has previously deposited funds via smartphone to another inmate at another facility that uses Telmate (as its inmate communications provider). Because of this past activity, the dossier download from Telmate includes several clustered geolocation coordinates on a map that are related to previous activity.
4. The investigator checks out the geographic coordinates and sees that they cluster around an abandoned building. The abandoned building leads to the arrest of another suspect and the discovery of a methamphetamine lab.

Attorney

1. The prosecuting attorney requests a download of all data associated with the original arrested detainee and a second download of all records associated with the newly arrested suspect.
2. The records are shared, through the legal discovery process, with the defense attorneys representing the suspects. Because the records can be downloaded as a single record, or organized batch of records, sharing this information with other attorneys involves just a few clicks.
3. The documents are discussed between the attorneys and the large amount of evidence that the two suspects are connected (through the records in the downloaded dossier), perhaps combined with other evidence gathered outside this invention, leads the suspects to plead guilty.

Archiving

1. The downloaded dossier file or files are archived in a manner that matches the County and State's required archiving process ensuring that documents are available five or ten years later when the two detainees are up for parole.

Figure 4:
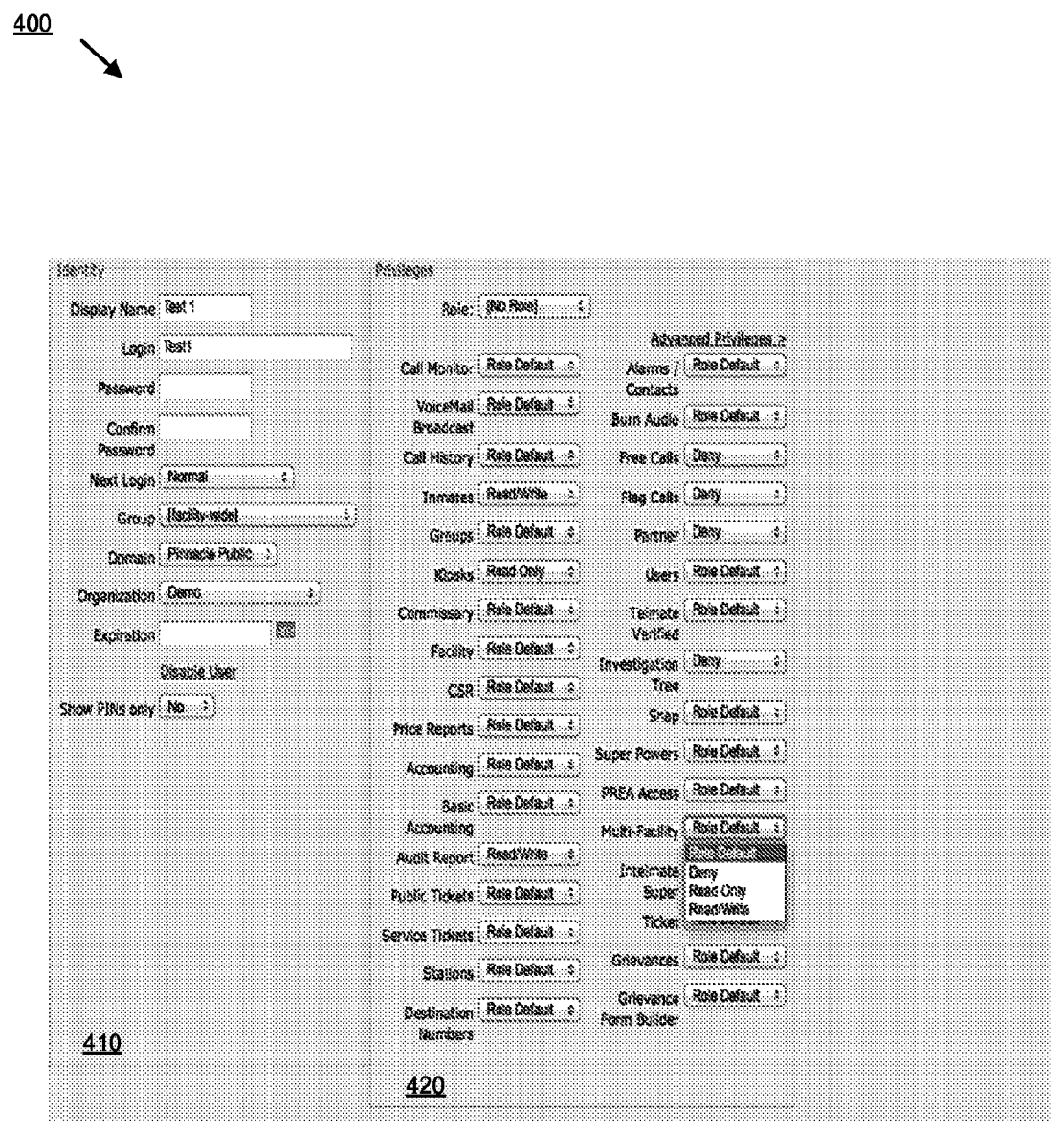

FIG. 4 conceptually illustrates an example graphical user interface (GUI) 400 for setting user restrictions according to some configurations of the subject technology. In some configurations, GUI 400 may be provided by the communications server 130 in an interface of a web-based application (e.g., administrator console).

As illustrated in FIG. 4, the GUI 400 includes one or more graphical elements. A graphical element can include, but is not limited to, a button, check box, radio button, slider, list box, drop-down list, menu, combo box, icon, text box, scroll bar, etc. In the example GUI 400, a graphical display area 410 provides, in different graphical elements, information associated with an individual (e.g., investigator, etc.) such as a display name, login, password, next login option, group, domain, and organization. A user may interact with the graphical elements (e.g., text fields, drop-down menu, etc.) in the graphical display area 410 to modify the information associated with the individual. Further, a graphical display area 420 provides, in different graphical elements, information corresponding to a set of privileges that define a set of user restrictions associated with the individual. A user may interact with the graphical elements (e.g., drop-down menu, etc.) in the graphical display area 420 to modify the set of privileges for different types of data that may be accessed by the individual (e.g., default, deny, read only, read/write). In this fashion, the subject technology provides granularity, on a per-user basis, in defining a set of user restrictions associated with an individual.

Figure 5:
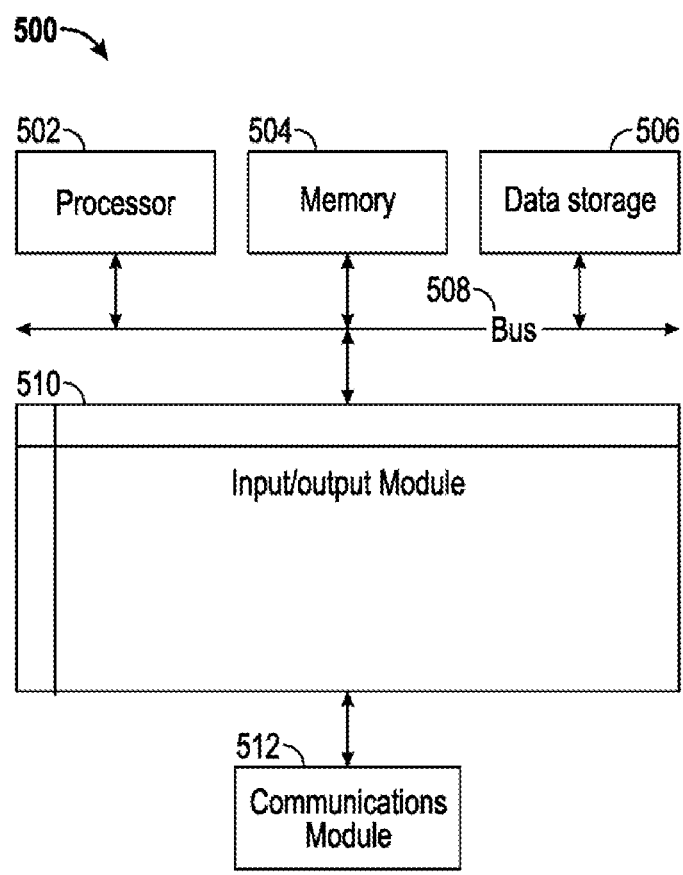
FIG. 5 is a block diagram illustrating an example computer system with which the communications terminal and communications server of FIG. 2 can be implemented.

FIG. 5 is a block diagram illustrating an example computer system 500 with which the communications terminal 110 and communications server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., communications terminal 110 and communications server 130) includes a bus 508 or other communication mechanism for communicating information, and a processor 502 (e.g., processor 212 and 242) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 204 and 246), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 214 and 244) include networking interface cards, such as Ethernet cards and modems. In certain aspects, the input/output module 510 is configured to connect to a plurality of devices, such as an input device (e.g., input device 216) and/or an output device 516 (e.g., display device 218). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices include display devices, such as a LED (light emitting diode), CRT (cathode ray tube), or LCD (liquid crystal display) screen, for displaying information to the user.

According to one aspect of the present disclosure, the communications terminal 110 and communications server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a PAN, LAN, CAN, MAN, WAN, BBN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description, including the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. These and other implementations are within the scope of the following claims.

The invention claimed is:

1. A computer-implemented method, the method comprising:
receiving a request from a user to log into a communications server, wherein the request includes user credentials;
authenticating the user based on the included user credentials in the request;
permitting the user to log into the communications server if the user is successfully authenticated;
receiving a first input selecting a person of interest;
retrieving information associated with the selected person of interest;
generating a dossier of information including the retrieved information associated with the selected person of interest; and
transmitting a link to the generated dossier to the user or to an indicated recipient, wherein the link expires after a predetermined amount of time.

2. The method of claim 1, wherein the selected person of interest comprises a detainee.

3. The method of claim 1, further comprising:
receiving a second input defining one or more filters for restricting information associated with the selected person of interest;
determining a set of user restrictions associated with the user;
retrieving information associated with the selected person of interest based on the defined one or more filters and the determined set of user restrictions;
receiving a third input selecting a download format for the retrieved information;
generating a second dossier of information including the retrieved information associated with the selected person of interest; and
transmitting the generated second dossier to the user or to a respective indicated recipient based on the selected download format.

4. The method of claim 3, wherein the set of user restrictions associated with the user comprises at least one of user privileges, access to data, or download permissions.

5. The method of claim 3, wherein the defined one or more filters comprise at least one of a time period, a type of data, a second person associated with the selected person of interest, or any person connected to the selected person of interest.

6. The method of claim 5, wherein the second person associated with the selected person of interest comprises a friend of the selected person of interest or a family member of the selected person of interest.

7. The method of claim 1, wherein the generated dossier includes one or more checksum values for verifying the retrieved information included in the generated dossier.

8. The method of claim 1, wherein the retrieved information associated with the selected person of interest includes data pertaining to at least one of an audio file, a video file, an attempted call, a completed call, a rejected call, a voicemail, a message left for customer service, a call to customer service representative, a call to automated customer service, an exchanged text, an exchanged photo, an exchanged video, a video visit scheduled, a video visit completed, a kiosk deposit, a deposit by mail, a deposit over a phone, a grievance or inmate request attempted, a grievance or inmate request submitted, a do not contact block via customer service, a do not contact block via web site, an investigator note, a customer service note, a visited website, a game played, a contact searched, a video station login, a web login by a friend or family, an inmate balance check, or an inmate balance transfer.

9. The method of claim 8, wherein all recording files and data are compressed or merged into a single downloadable file.

10. The method of claim 1, wherein the selected download format comprises one of an e-mail including a link to the generated dossier, a compressed file, a Portable Document Format (PDF) file, an MHTML file, or and webarchive file.

11. The method of claim 10, wherein the link to the generated dossier expires after a predetermined period of time.

12. A system, the system comprising:
a memory comprising instructions; and
one or more processors configured to execute the instructions to:
receive a request from a user to log into a communications server, wherein the request include user credentials;
authenticate the user based on the included user credentials in the request;
permit the user to log into the communications server if the user is successfully authenticated;
receive a first input selecting a person of interest;
receive a second input defining one or more filters for restricting information associated with the selected person of interest;
determine a set of user restrictions associated with the user;
retrieve information associated with the selected person of interest based on the defined one or more filters and the determined set of user restrictions;
receive a third input selecting a download format for the retrieved information;
generate a dossier of information including the retrieved information associated with the selected person of interest; and
transmit a link to the generated dossier to the user or an indicated recipient based on the selected download format, wherein the link expires after a predetermined period of time.

13. The system of claim 12, wherein the selected person of interest comprises a detainee.

14. The system of claim 12, wherein the defined one or more filters comprise at least one of a time period, type of data, a second person associated with the selected person of interest, or any person connected to the selected person of interest.

15. The system of claim 14, wherein the second person associated with the selected person of interest comprises a friend of the selected person of interest or a family member of the selected person of interest.

16. The system of claim 12, wherein the generated dossier includes one or more checksum values for verifying the retrieved information included in the generated dossier.

17. The system of claim 12, wherein the retrieved information associated with the selected person of interest includes data pertaining to at least one of an audio file, a video file, an attempted call, a completed call, a rejected call, a voicemail, a message left for customer service, a call to customer service representative, a call to automated customer service, an exchanged text, an exchanged photo, an exchanged video, a video visit scheduled, a video visit completed, a kiosk deposit, a deposit by mail, a deposit over a phone, a grievance or inmate request attempted, a grievance or inmate request submitted, a do not contact block via customer service, a do not contact block via web site, an investigator note, a customer service note, a visited website, a game played, a contact searched, a video station login, a web login by a friend or family, an inmate balance check, or an inmate balance transfer.

18. The system of claim 17, wherein all recording files and data are compressed or merged into a single downloadable file.

19. The system of claim 12, wherein the set of user restrictions associated with the user comprise at least one of user privileges, access to data, or download permissions.

20. A non-transitory, computer readable medium comprising instructions stored therein, which when executed by a machine, cause the machine to perform operations comprising:
- receiving a request from a user to log into a communications server, wherein the request includes user credentials;
- authenticating the user based on the included user credentials in the request;
- permitting the user to log into the communications server if the user is successfully authenticated;
- receiving a first input selecting a person of interest;
- receiving a second input defining one or more filters for restricting information associated with the selected person of interest;
- determining a set of user restrictions associated with the user;
- retrieving information associated with the selected person of interest based on the defined one or more filters and the determined set of user restrictions;
- receiving a third input selecting a download format for the retrieved information;
- generating a dossier of information including the retrieved information associated with the selected person of interest; and
- transmitting a link to the generated dossier to the user or to an indicated recipient based on the selected download format, wherein the link expires after a predetermined period of time.

* * * * *